(12) United States Patent
Imhof et al.

(10) Patent No.: US 8,662,097 B2
(45) Date of Patent: Mar. 4, 2014

(54) FLOW CONTROL VALVE WITH DAMPING CHAMBER

(75) Inventors: Rainer Imhof, Frammersbach (DE); Wolfgang Spahn, Gemuenden am Main (DE)

(73) Assignee: Robert Bosch GmbH, Stuttgart (DE)

( * ) Notice: Subject to any disclaimer, the term of this patent is extended or adjusted under 35 U.S.C. 154(b) by 362 days.

(21) Appl. No.: 13/010,645

(22) Filed: Jan. 20, 2011

(65) Prior Publication Data

US 2011/0197979 A1 Aug. 18, 2011

(30) Foreign Application Priority Data

Jan. 23, 2010 (DE) .......................... 10 2010 005 524

(51) Int. Cl.
*G05D 11/00* (2006.01)

(52) U.S. Cl.
USPC .............. 137/115.1; 137/115.15; 137/115.22; 137/501; 251/36; 251/50

(58) Field of Classification Search
USPC ............. 137/596.17, 596.16, 625.64, 625.67, 137/625.68, 625.69, 501, 503, 115.05, 137/115.08, 115.1, 115.15, 115.21, 115.22, 137/862, 870, 881, 883; 251/36, 50

See application file for complete search history.

(56) References Cited

U.S. PATENT DOCUMENTS

| | | | | |
|---|---|---|---|---|
| 4,576,200 | A | * | 3/1986 | Janecke et al. ............ 137/624.13 |
| 4,630,640 | A | * | 12/1986 | DiBartolo ...................... 137/501 |
| 5,275,207 | A | * | 1/1994 | Tonhauser et al. ........ 137/596.17 |
| 5,282,604 | A | * | 2/1994 | Wade ......................... 137/625.64 |
| 5,639,066 | A | * | 6/1997 | Lambert et al. ................. 251/282 |
| 5,836,335 | A | * | 11/1998 | Harms et al. ............. 137/625.64 |
| 6,029,703 | A | * | 2/2000 | Erickson et al. ......... 137/625.64 |
| 6,578,606 | B2 | * | 6/2003 | Neuhaus et al. ......... 137/625.68 |
| 6,966,329 | B2 | | 11/2005 | Liberfarb |
| 7,104,283 | B2 | * | 9/2006 | Ino et al. .................. 137/625.69 |
| 7,717,128 | B2 | * | 5/2010 | Pataki ...................... 137/596.17 |
| 2002/0134443 | A1 | * | 9/2002 | Sudani et al. ............ 137/625.65 |

* cited by examiner

*Primary Examiner* — Craig Schneider
*Assistant Examiner* — Craig J Price
(74) *Attorney, Agent, or Firm* — Maginot, Moore & Beck

(57) ABSTRACT

A valve, preferably of the flow control construction type, has a valve piston or pressure regulator piston mounted in an axially displaceable manner in a valve housing. The valve piston and the valve housing form a damping chamber for the motional damping of the valve piston.

11 Claims, 2 Drawing Sheets

FLOW CONTROL VALVE WITH DAMPING CHAMBER

This application claims priority under 35 U.S.C. §119 to German patent application no. 10 2010 005 524.7, filed Jan. 23, 2010, the disclosure of which is incorporated herein by reference in its entirety.

BACKGROUND

The disclosure relates to a valve, in particular a flow control valve.

Basically, flow valves are valves which serve to regulate the flow rate of a fluid that is used. A butterfly valve as a subassembly of a flow valve is an adjustable constriction in the line flow, which constriction is brought about by the valve. As a result of the hereby increasing flow resistance, the volumetric flow rate changes as a function of the pressure gradient which becomes established via the valve. Unlike the abovementioned butterfly valve, a flow control valve as a further subassembly of a flow valve is additionally equipped with a pressure compensation. As a result, even if a pressure gradient established via the valve changes, a set volumetric flow rate remains unaltered, i.e. the volumetric flow rate is independent of the pressure gradient currently available at the valve. In more concrete terms, this is basically achieved by assigning to an adjustable measuring orifice a pressure regulator, which is acted upon by a spring force, as well as in the opening direction by a pressure prevailing downstream of the measuring orifice and in the closing direction by a pressure prevailing upstream of the measuring orifice. This pressure regulator can here be connected in principle directly upstream or downstream of the variable measuring orifice, and can also be integrated in the measuring orifice.

A flow control valve of this generic type is known from the prior art, for example according to U.S. Pat. No. 6,966,329 B2.

This concerns a proportional pilot-operated flow control valve having a housing in which a hollow compensating piston is arranged in an axially displaceable manner. In the compensating piston is mounted a metering-guide component, a control piston being arranged so as to be able to slide within the guide component. At an axial distance from the metering-guide component, there is also slidably provided within the compensating piston a damping-guide element, which forms a damper chamber in the compensating piston. Inserted in the damper chamber is a biasing spring, which biases the damping-guide element in one direction so as to make contact with the end face of the metering-guide component and which biases the compensating piston in an opposite direction so as to make contact with the end face of the housing. Inserted in the hollow control piston is a control spring, which forces the end face of the control piston against the damping-guide element. Finally a cartridge housing is provided, in which a pilot valve assembly is housed and which is fitted to the valve housing via an adapter.

Although, according to this prior art, the axial motion of the control piston is basically damped by the damping-guide element, the entire valve construction proves to be extremely complex and thus prone to faults, particularly in the small signal range.

SUMMARY

It is hence an object of the present disclosure to provide a valve of this generic type which has a simpler construction. In this context, one aim of the disclosure is to reduce the liability to faults and to make the valve more flexible to individual usage requirements through the provision of a system tuning facility.

This object is achieved by a valve, preferably for the adjustment of a pressure medium volumetric flow rate, having the features of the present disclosure.

The basic principle of the disclosure hence consists in forming a damping chamber by means of a valve piston mounted directly on the valve housing, with interaction between these two components, i.e. the damping chamber is configured between the valve piston and the valve housing (cartridge). The whole design of the valve is thereby simplified.

Preferably, the damping effect is adjusted or adjustable by a restriction opening fluid-connected to the damping chamber. For this purpose, the damping chamber is further preferably configured on an axial end portion of the valve piston, between the valve piston, the valve housing and an axial end plate in which the valve piston is guided in the axial direction. The restriction opening is here advantageously formed by an annular gap between the end plate and the valve piston and/or by at least one bore in the end plate. This produces an extremely compact and, at the same time, simple construction, whereby manufacturing costs are reduced. At the same time, the possibility exists of preparing end plates having different bore diameters and thus different restriction values and of installing these end plates according to requirement. In this way, the damping effect of the valve can be easily adapted to the characteristics of a fluid system in which the valve according to the disclosure is to be installed. This increases the functionality and flexibility of the valve.

An advantageous refinement of the disclosure provides that the end plate is held by a locking ring, which is preferably configured as a spring ring and engages positively in an inner peripheral groove in the valve housing. As a result, there is no axial play between the valve housing and the end plate and the response behavior of the valve is improved.

It is also advantageous that the valve piston has a sliding portion, which is in sliding contact with the valve housing and which, on one axial end portion of the valve piston, is delimited by a radial recess, which is slidingly accommodated in the end plate and defines the damping chamber axially between the end plate and the sliding portion of the valve piston and radially between the valve piston and the valve housing. In this way, the volume of the damping chamber can be individually adapted to the framework conditions of the respective fluid system by the adoption of minor machining measures.

BRIEF DESCRIPTION OF THE DRAWING

The disclosure is explained in greater detail below on the basis of a preferred illustrative embodiment with reference to the accompanying figure, wherein.

DETAILED DESCRIPTION

Figure 1:
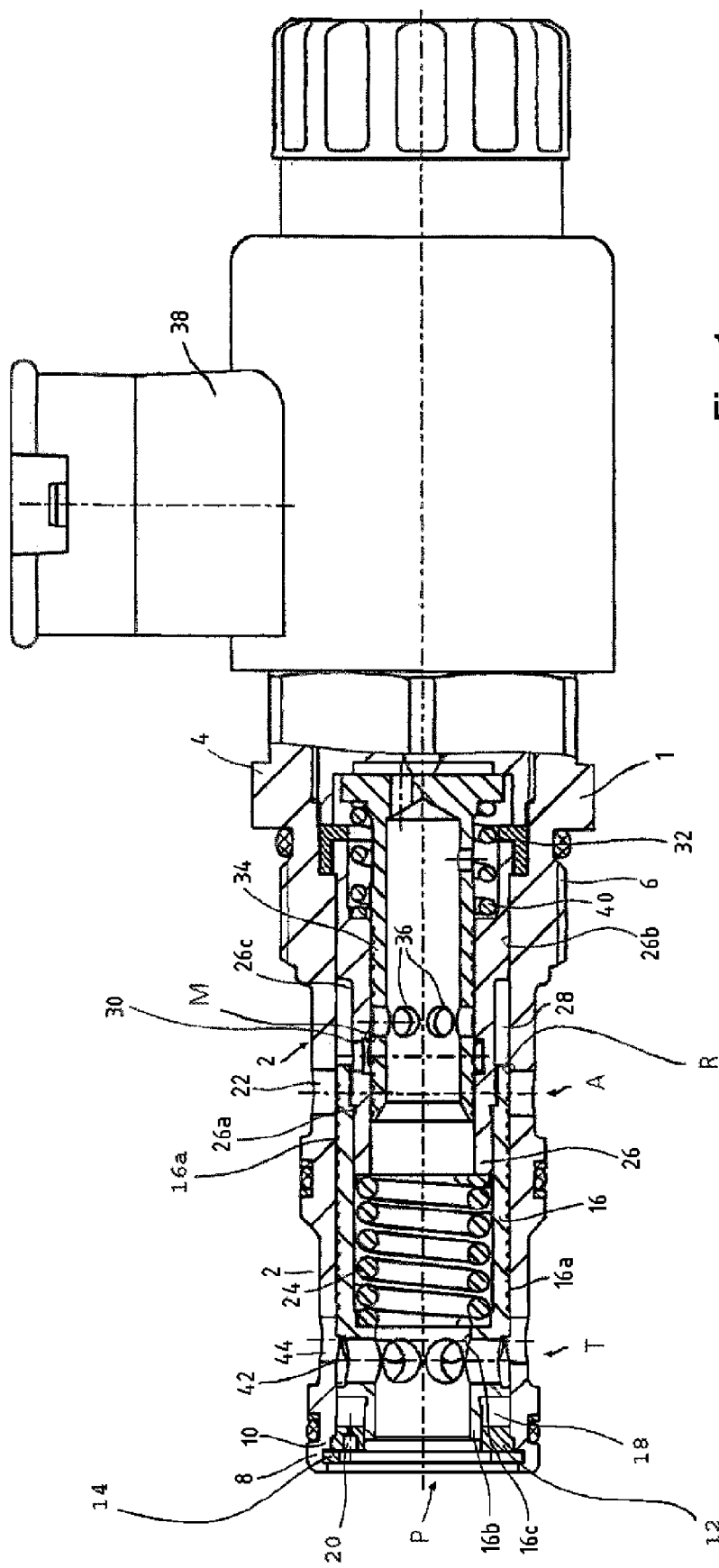
FIG. 1 shows a directly operated flow control valve according to a first preferred illustrative embodiment of the disclosure, with integrated pressure regulator and pressure regulator piston damping.
Figure 3:
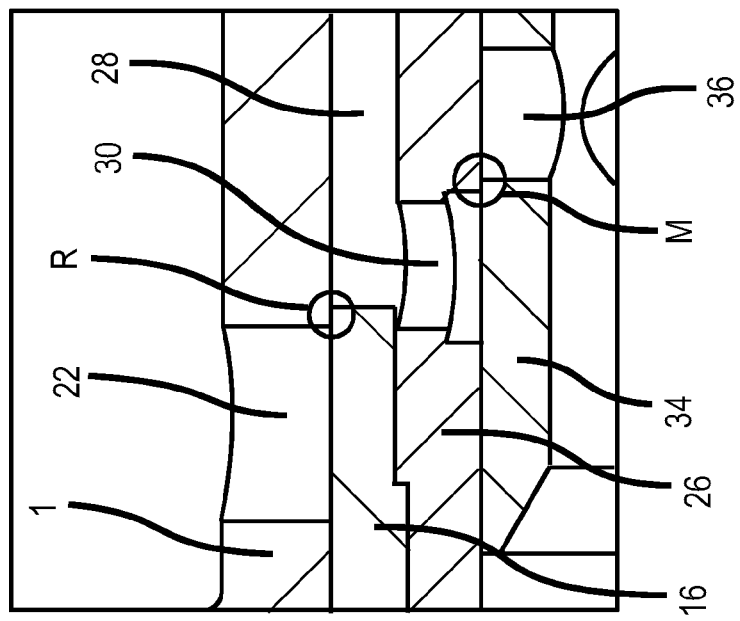
FIG. 3 is an enlarged view of another portion of the flow control valve of FIG. 1 showing a measuring orifice and a control orifice of the flow control valve.
Figure 2:
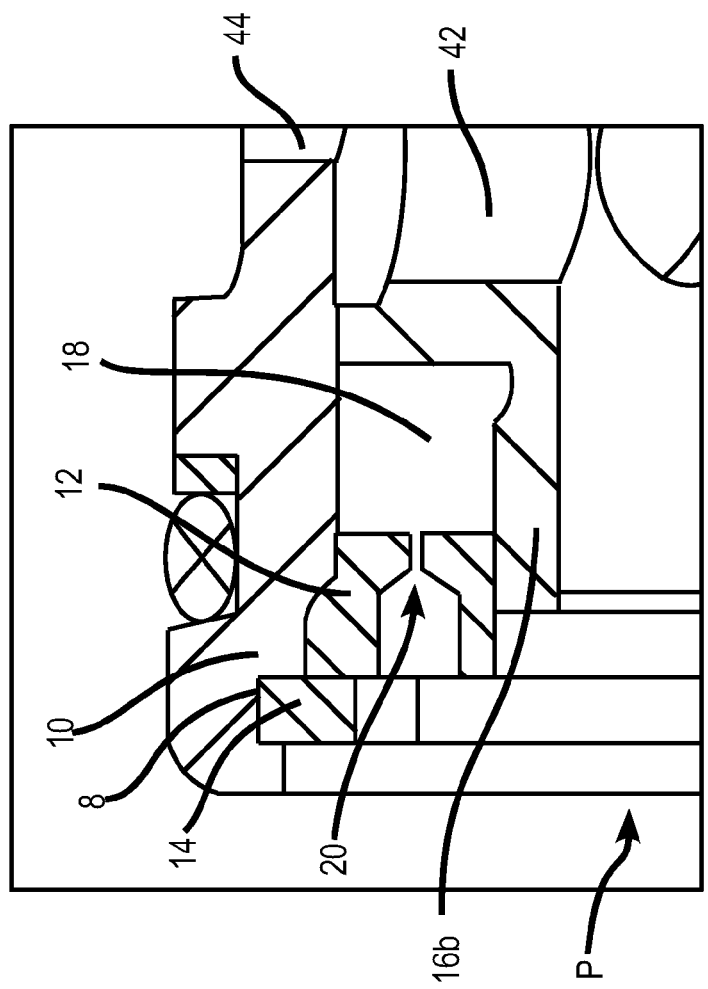
FIG. 2 is an enlarged view of a portion of the flow control valve of FIG. 1 showing a restriction nozzle formed in an end plate and a damping space of the flow control valve.

In FIG. 1, a preferably directly operated flow control valve according to the preferred illustrative embodiment of the disclosure is represented in cartridge construction. The flow control valve according to the disclosure consequently has a cartridge-shaped housing in the form of a sleeve, which on its outer peripheral surface is shaped with a number of axially spaced radial steps 2. The sleeve 1 has on one axial end portion a radially protruding stop ring 4, which has immediately ahead of it an externally threaded portion 6 to allow the sleeve 1 to be screwed, for example, into a valve block (not shown).

On that axial end side of the sleeve 1 which lies opposite the stop ring 4, an axial port P, preferably for the connection of a pressure medium feed device (not shown), is provided. On this axial end side, the sleeve 1 is shaped with an inner peripheral groove 8, which is adjoined, at a small axial distance apart, by a circumferential inner radial shoulder of lesser diameter. Inserted between this radial shoulder 10 and the peripheral groove 8 is an end plate 12, which is held in an, as far as possible, axially play-free manner by a locking ring 14 (spring ring), which is snapped into the peripheral groove 8.

Furthermore, inserted in an axially displaceable manner in the sleeve 1 is a hollow/sleeve-shaped pressure regulator piston 16, which has an axially extending sliding portion 16a which has direct sliding contact with the sleeve 1 on the inner wall thereof. On that end portion of the pressure regulator piston 16 which is facing the end plate 12, said pressure regulator piston has a radial outer recess 16b, which, starting from the sliding portion 16a, extends as far as that end face of the pressure regulator piston 16 which is facing the end plate 12. In the end plate 12, a through bore or through hole is shaped, such that the pressure regulator piston 16, in the region of its outer radial recess 16a, can be introduced slidingly (centrally) into the end plate 12. As a result, an annular space 18 is configured between the pressure regulator piston 16, the inner sleeve wall and the end plate 12, which annular space defines a damping chamber 18 (described below). Furthermore, in the end plate 16, at least one further decentralized through bore 20 of predetermined (small) diameter is shaped, which connects the damping chamber to the axial port P and defines a restriction nozzle (further described below).

The housing sleeve 1 has in an axial middle portion at least one radial through bore 22, which represents an outlet port A of the valve according to the disclosure. The pressure regulator piston 16 here has an axial length which is defined such that the pressure regulator piston 16, in a first, retracted position (maximally distanced from the end plate 12) completely closes off the radial bore 22 in the housing sleeve. In this position, the damping chamber 18 has a maximal spatial volume.

The inner axial end face of the pressure regulator piston 16 here forms with the housing sleeve 1, in the region of the radial bore 22 shaped therein, a control orifice R of the valve.

The pressure regulator piston 16 is also biased by means of a biasing spring 24 in the direction of the end plate 12 for opening of the radial bore 22 in the housing sleeve 1. This biasing spring 24 is inserted for this purpose in the hollow pressure regulator piston 16 and for this purpose is axially supported against a radially inwardly protruding peripheral projection 16c on the pressure regulator piston 16. An oppositely directed spring seat is further formed by a guide sleeve 26, which, on an end portion facing away from the end plate 12, is slidingly inserted in the pressure regulator piston 16 and, at the same time, forms an axial stop for the pressure regulator piston 16 for definition of the first, above-described position of the pressure regulator piston 16. For this purpose, the guide sleeve 26 has on an end portion a radially outer shoulder projection 26a, which can be brought into operative engagement with the pressure regulator piston 16 for an axial stop. Furthermore, the guide sleeve 26 has at least on its other end portion an outer peripheral surface 26b, which is in bearing contact against the inner wall of the housing sleeve 1, preferably forming a seal with said housing sleeve. In an axial middle portion 26c of the guide sleeve 26, axially between the pressure regulator piston 16 or the shoulder projection 26a and the contact surface 26b with the housing sleeve 1, an axially extending circumferential annular space 28 is configured, which is axially delimited by the pressure regulator piston 16. Into this circumferential annular space 28 between the pressure regulator piston 16 of the housing sleeve 1 and the guide sleeve 26, at least one radial bore 30 in the guide piston 26 emerges at an axial location which cannot be covered over by the pressure regulator piston 16. Finally, the guide sleeve 26 is held axially by its inner end portion facing away from the pressure regulator piston 16 by an end stop 32 supported against the housing sleeve 1.

In the guide sleeve 26, from its side facing away from the pressure regulator piston 16, an actuating piston 34 in the form of a sleeve is inserted in a sliding and sealing arrangement. This actuating piston 34 has in a middle portion a number of radial bores 36, which form with the at least one radial bore 30 in the guide sleeve 26 an adjustable measuring orifice M. That is to say, in dependence on the axial relative position between the actuating piston 34 and the guide sleeve 26, the measuring orifice M formed by the respective radial bores 30, 36 is partially opened in a predetermined manner, whereby the annular space formed by the radially outer periphery of the guide sleeve 26 gains fluid access to the axial port P of the valve. In the present illustrative embodiment according to FIG. 1, the actuating piston 34 is directly operated, i.e. actuated preferably by means of an electromagnetic positioning drive 38, the actuating piston 34 being additionally biased by means of an adjusting spring 40 into a closing position, represented according to FIG. 1, in which the measuring orifice M formed by the radial bores 30, 36 in the actuating piston 34 and the guide sleeve 26 surrounding these is fully closed.

Finally, the pressure regulator piston 16, in an axial portion immediately behind the damping space 18, is configured with a number of radial bores 42, which, in dependence on the axial position of the pressure regulator piston 16 with respect to the housing sleeve 1, can be connected to a further radial bore 44 in the housing sleeve 1 in order thereby to open a bypass circuit T, as is further described below.

The working method of the flow control valve with integrated pressure regulator and damping chamber, which valve is described in terms of its design above, is described in fuller detail below:

In the switching position represented according to FIG. 1, the actuating piston 34 is unactuated, i.e. the preferably electromagnetic positioning drive 38 is in a de-energized state. In this case, the actuating piston 34 is forced by the adjusting spring 40 into, according to FIG. 1, a right-hand stop position, in which the measuring orifice M formed between the radial bores 36 in the actuating piston 34 and the at least one radial bore 30 in the guide sleeve 26 surrounding said bores 36, is fully closed. Consequently, no pressure medium conveyed via the axial port P of the valve into the interior of the pressure regulator piston 16, the guide sleeve 26 and the actuating piston 34 finds its way into the annular space 28 formed on the radial outer side of the guide sleeve 26. In this switching position, the pressure regulator piston 16 is consequently forced merely by the biasing spring 24 in the direction of the end plate 12, whereupon a counterpressure which builds up by way of the (restriction) bore 20 in the end sleeve 12 forces the pressure regulator piston 16 counter to the biasing force of the biasing spring 24 in the direction of the axial stop 26a formed by the guide sleeve 26. That is to say, in this switching position the pressure regulator piston 16 assumes the first axial position, in which the control orifice R formed between the pressure regulator piston 16 and the housing sleeve 1 is fully closed and thus the outlet port A is shut off. In this switching position, furthermore, a connection between the axial port P and the bypass circuit T is opened, so that pressure medium is able to circulate via the flow control valve according to the preferred illustrative embodiment.

If the preferably electromagnetic positioning drive 38 is now actuated, this applies an axial positioning force to the actuating piston 34, counter to the adjusting spring force, and displaces said actuating piston in the axial direction toward the end plate 12. The measuring orifice M formed between the guide sleeve 26 and the actuating piston 34 is hereupon opened in accordance with the set control value of the actuating piston 34 and thus a restricted access between the axial port P of the valve and the annular space 28 formed between the guide sleeve 26 and the housing sleeve 1 is created. The pressure which is thereby built up in the annular space produces an axial displacement of the pressure regulator piston in the direction of the end plate 12, this displacement motion being damped by a restricted flow-off of pressure medium out of the damping chamber 18 via the axial restriction bore 20 (or annular gap).

Due to the damped axial motion of the pressure regulator piston 16, the control orifice R formed between the pressure regulator piston 16 and the housing sleeve 1 opens, whereby a restricted opening between the annular space 28 and the outlet port A of the valve is created. At the same time, as a result of the axial motion of the pressure regulator piston 16, the connection between the axial port P and the bypass circuit T is closed. Pressure medium can now therefore flow via the axial port P, the measuring orifice M, the annular space 28 and the control orifice R into the outlet port A of the valve.

Following this, it should be pointed out that it is also possible to modify the flow control valve with integrated pressure regulator and damping chamber by replacing the above-described direct operation of the actuating piston 34 with a pilot mechanism. In this case, the preferably electromagnetic drive 38 actuates a pilot valve, via which the actuating piston 34 is axially adjustable.

Reference Symbol List
1 housing sleeve
2 radial steps
4 stop ring
6 externally threaded portion
P axial port
8 inner circumferential groove
10 radial shoulder
12 end plate
14 locking ring
16 pressure regulator piston
16a sliding portion
16b radially outer recess
16c inwardly protruding peripheral projection
18 damping chamber
20 restriction nozzle
22 radial through bore in housing sleeve
A outlet port
R control orifice
24 biasing spring
26 guide sleeve
26a radially outer shoulder projection
26b radially outer contact surface
26c radially set-back outer axial middle portion
28 annular space
30 radial bore(s) in guide sleeve
32 end stop
34 actuating piston
36 radial bore(s) in the actuating piston
M measuring orifice
38 electrical positioning drive/pilot mechanism
40 adjusting spring
42 radial bore(s) in the pressure regulator piston
44 radial bore(s) in the housing sleeve 1
T bypass port

What is claimed is:

1. A valve, comprising:
a valve housing;
a pressure regulator piston mounted in an axially displaceable manner in said valve housing and having a first axial end portion; and
an axial end plate fixed in the valve housing and having a central bore through which the pressure regulator piston is axially guided;
a substantially enclosed damping chamber defined by the axial end portion of the pressure regulator piston, the valve housing, and the axial end plate, the damping chamber being configured to damp axial motion of the pressure regulator piston; and
a restriction nozzle configured to restrict flow of a fluid into and out from the damping chamber to damp the axial motion of the pressure regulator piston.

2. The valve according to claim 1, wherein the restriction nozzle is defined by at least one bore in the axial end plate.

3. The valve according to claim 2, wherein the axial end plate is axially supported by a spring ring positively engaging in an inner peripheral groove in the valve housing.

4. The valve according to claim 3, wherein:
the pressure regulator piston has a sliding portion, which is in sliding contact with the valve housing and which is delimited by a radial recess on the first axial end portion of the pressure regulator piston, and
the radial recess is slidingly accommodated in the axial end plate and defines the damping chamber axially between the axial end plate and the sliding portion of the pressure regulator piston.

5. The valve according to claim 4, further comprising:
an axial port positioned at the first axial end portion of the pressure regulator piston,
wherein the restriction nozzle opens into the axial port.

6. The valve according to claim 5, wherein the valve is a flow control valve and the pressure regulator piston is a valve piston.

7. The valve according to claim 6, wherein:
the pressure regulator piston includes a sliding sleeve,
the sliding sleeve, at a second opposite axial end portion of the pressure regulator piston, and the valve housing define a control orifice of the pressure regulator, configured to control opening of an outlet port of the valve, and
the valve housing includes at least one radial through bore configured to be closed by the pressure regulator piston to control opening of the outlet port of the valve.

8. The valve according to claim 7, further comprising:
a guide sleeve mounted within the pressure regulator piston and the valve housing, extending axially from the second end portion of the pressure regulator piston, wherein the guide sleeve defines an annular space between the guide sleeve and the valve housing, and is configured to impart pressure on an end face of the pressure regulator piston.

9. The valve according to claim 8, further comprising:
a direct-operated or pilot-operated sleeve-shaped actuating piston guided in an axially displaceable manner in the guide sleeve, and
an adjustable measuring orifice defined by the actuating piston and the guide sleeve configured to control a supply of pressure medium into the annular space.

10. The valve according to claim 9, wherein the measuring orifice is defined by a first number of radial bores in the actuating piston and by second radial bores in the guide sleeve, said second radial bores overlapping said first number of radial bores in dependence on an axial relative position of the actuating piston and the guide sleeve.

11. The valve according to claim 1, wherein the axial end plate has an outer annular portion surrounding the central bore, and the restriction nozzle is defined as a through bore in the outer annular portion of the axial end plate.

* * * * *